Figure 1:
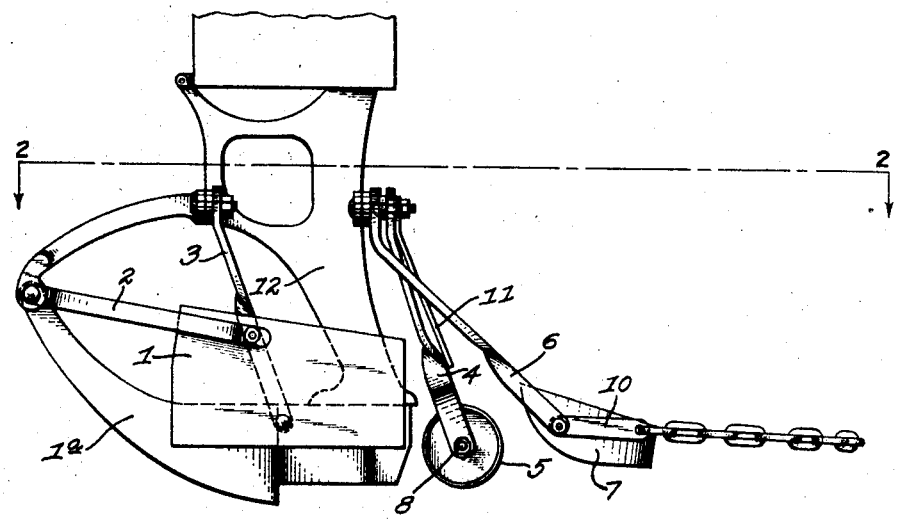
Figure 2:
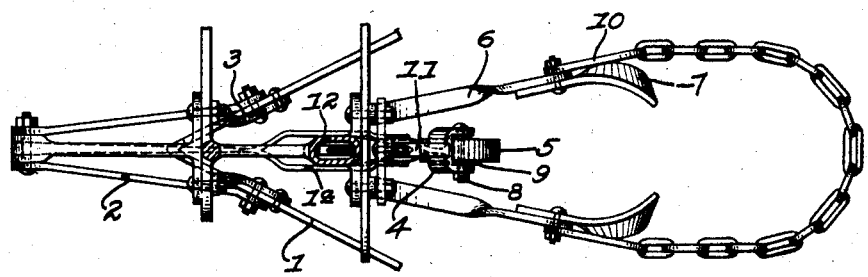

July 12, 1927.

J. S. TOWNSEND ET AL 1,635,866

ATTACHMENT FOR COTTON PLANTERS

Filed Dec. 24, 1925

INVENTORS
J. S. TOWNSEND
W. B. CAMP.

WITNESSES.

ATTORNEYS.

Patented July 12, 1927.                                                1,635,866

UNITED STATES PATENT OFFICE.

JAMES S. TOWNSEND, OF SACATON, ARIZONA, AND WOFFORD B. CAMP, OF SHAFTER, CALIFORNIA; DEDICATED, BY MESNE ASSIGNMENTS, TO THE CITIZENS OF THE UNITED STATES.

ATTACHMENT FOR COTTON PLANTERS.

Application filed December 24, 1925. Serial No. 77,572.

(GRANTED UNDER THE ACT OF MARCH 3, 1883; 22 STAT. L. 625.)

This application is made under the act of March 3, 1883, chapter 143 (22 Stat. L. 625) and the invention herein described and claimed may be used by the Government of the United States or any of its officers or employees in the prosecution of work for the Government, or by any citizen of the United States, without payment to us of any royalty thereon.

Throughout the irrigated valleys of the Southwest where cotton is being grown many growers are unable to secure satisfactory stands of cotton. Sometimes this may be due to adverse or unfavorable seasonal conditions or to several other unforeseen factors, but too often the difficulty is due to unsatisfactory planting machines.

A special planting problem is often encountered on account of the nature of much of the soil. Some soil dries out so quickly that even in a day or two of drying weather there may not be sufficient moisture left to germinate seed placed in the upper inch or two inches of soil. Also care must be exercised to avoid a crust which forms on many of the soils as a result of pressure from the planting tool. Practically all of the commercial planters used in the Southwest are equipped with a type of "runner" shoe which, in opening up the soil, often compacts and glazes the sides of the furrow. Under such conditions the wheel that follows the shoe does not close the furrow properly, but leaves a narrow open track of packed earth along the middle of the furrow, which allows the soil around the seed to dry out quickly. Even where no groove is apparent on the surface, investigation may show that the pressing of the soil, especially if a little too wet, has closed the groove at the surface but has left a hollow channel underneath, so that the seeds do not have sufficient contact with the soil to start germination.

We claim that it has been found possible to overcome these difficulties by using the attachments described herein and shown in the accompanying drawing. Fig. I represents a side view of the attachments on the cotton planter; and Fig. II, a view along the line 2—2 of Fig. I.

Referring to the drawing, the attachments comprise a shoe or scraper attachment 1 designed to push away clods and dry surface soil, enabling the planting machine to penetrate a constant depth in the moist earth of the seed bed; a small press wheel 5 operating in the seed groove just back of the seed spout of the planting machine; a spring 11 controlling the pressure of the press wheel 5 in the seed groove; two curved knives 7 and scraper arms 6 to cover the seed planted to a constant depth; and a chain or drag 10.

The scraper attachment 1 consists of a shoe designed to fit over the planter shoe 1ª of a standard planting machine, in which the arms 3 and flanges 1 are shown bent outward and backward at an angle which may vary from 20° to 45° in such a manner that the lower edge shall remain approximately parallel to the surface of the ground. This shoe 1 when attached to the standard planter machine, pushes aside clods and loose dry surface soil so that the penetration of the point of the planting machine is enabled to continue discharging seeds at a uniform depth in the seed bed.

The small press wheel 5 mounted on the adjustable holder 4, when attached to a planter shoe of the standard planter, will operate in the seed groove just back of the seed spout 12 and, passing over the seed immediately after it is dropped from the planter shoe 1ª, presses the seed firmly into the seed bed.

The spring 11 is mounted in association with the holder 4 for the press wheel 5 to enable any desired tension or pressure to be transmitted through the press wheel 5 to the seed in the seed groove.

The two curved scraper arms 6 equipped with covering blades 7 are so attached to the planter frame of the standard planter, immediately behind the press wheel 5, as to cover the seed to a uniform depth in the seed bed. These blades 7 are curved and follow the planter shoe 1 in such a way as to accomplish a slight firming of the soil, yet this attachement does not exhibit the tendency to pack as is shown in the case of the covering gear of standard planting machinery, the seed-covering wheel being dispensed with when this attachment is used.

The chain or drag 10 is attached immediately behind the covering blades just described. This drag operates in a slight degree to firm the planted seed row but is primarily for the purpose of smoothing and finishing the planted row and leaving a slight dust or soil mulch on the surface.

The several devices are shown in the drawing as arranged for use when attached to a standard planter.

The original planter wheels of a standard planting machine ordinarily follow upon the seed row and act as a covering tool in addition to carrying the weight of the machine. However, as previously mentioned, this often causes a hard crust to form on the surface through which the seedlings can not push and thereby seriously impairing the stand. To avoid this difficulty, when the combined attachments as described above are used, the planter wheels are moved to one side of the seed row. For narrow rows the wheels should operate on the outside of the seed rows, in which case it may be necessary to install a longer axle in some makes of planters, but for wide rows the wheels can come inside the seed rows.

Where this method is used it has been found that the seed can be covered somewhat more deeply with the loose surface soil but experiments have also shown that where the small press wheel was used in conjunction with the shoe attachment, the seed germinated and a perfect stand of cotton was secured with only about one-quarter inch of soil over the seed. Examination showed the soil on top of the seed to be dry but the seed itself, being pressed firmly into moist soil, was kept in contact with sufficient moisture to insure proper germination. While the use of this planter attachment seems to give more leeway or margin in specifying the exact depth of covering, yet it has been found that under average conditions a covering of 1" to 1½" gave most satisfactory results and insured a perfect stand.

We claim:

In combination with a planter shoe, a V-shaped scraper blade mounted on the forward end of the shoe for removing clods and dry surface soil adjacent the planter shoe, thereby enabling the planter shoe to penetrate moist earth to make a groove having a slight and uniform depth, means for depositing seed in the groove, a narrow roller for pressing the seed in the bottom of the groove, inwardly earth directing means for covering the seed, and means for leveling the earth, the expanse of the covering and leveling means being less than that of the scraper, thereby leaving nothing but fresh earth for covering the seed.

JAMES S. TOWNSEND.
WOFFORD B. CAMP.